UNITED STATES PATENT OFFICE.

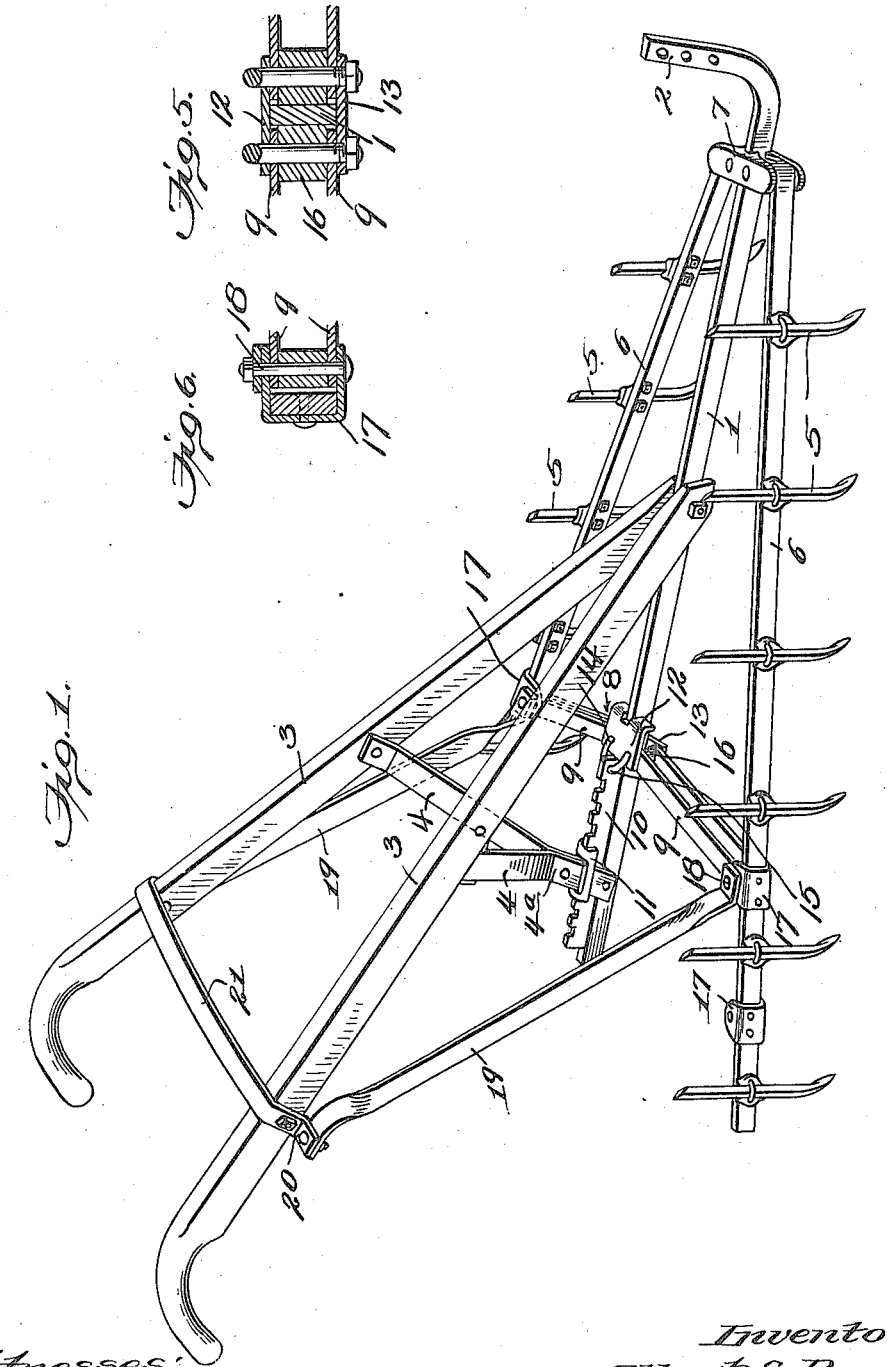

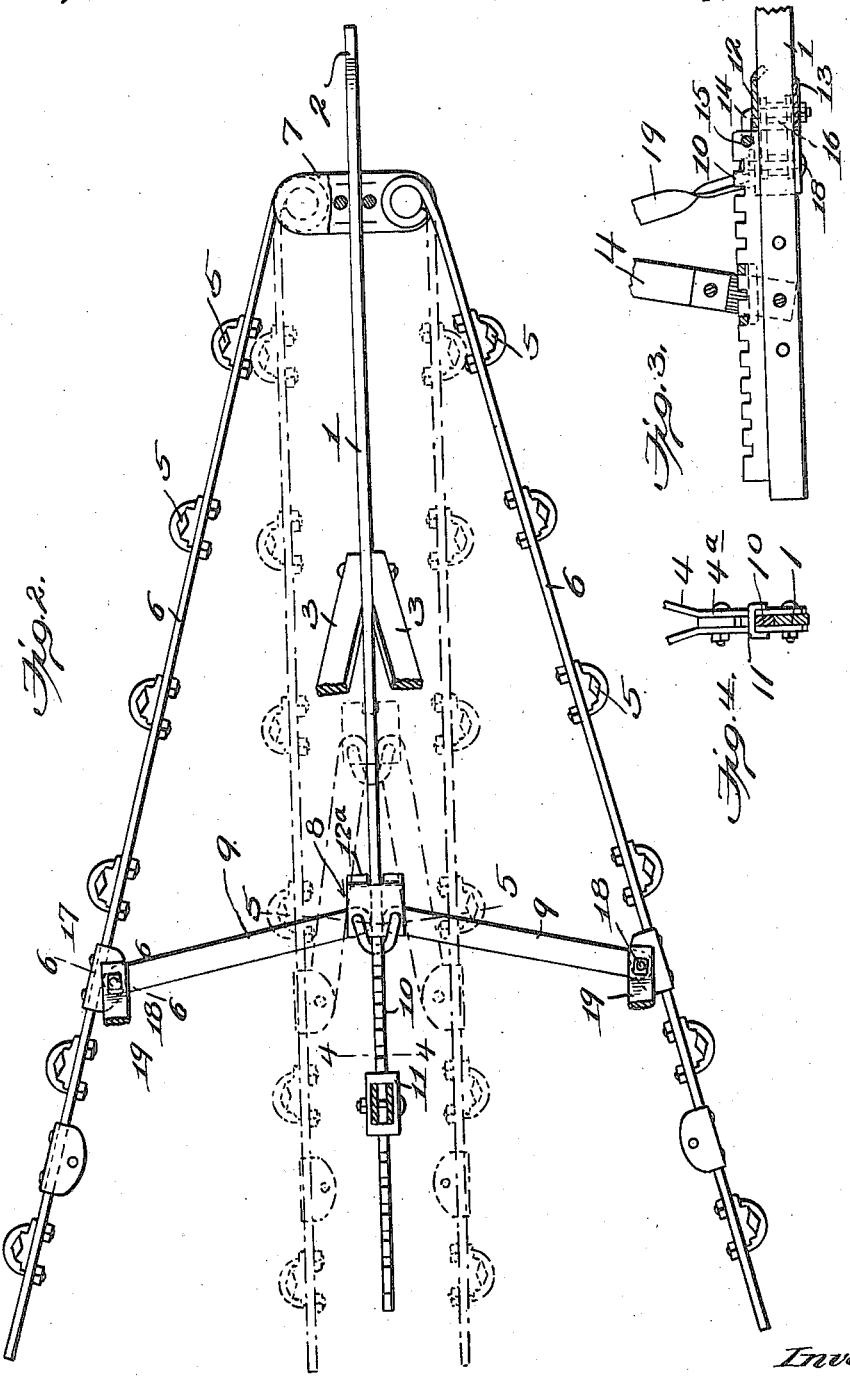

ALBERT S. POE, OF COLDWATER, MISSISSIPPI, ASSIGNOR TO A. G. PERRY PLOW CO., OF COLDWATER, MISSISSIPPI, A CORPORATION OF MISSISSIPPI.

CULTIVATING IMPLEMENT.

1,233,121. Specification of Letters Patent. Patented July 10, 1917.

Application filed July 17, 1914. Serial No. 851,627.

*To all whom it may concern:*

Be it known that I, ALBERT S. POE, a citizen of the United States, residing at Coldwater, in the county of Tate and State of Mississippi, have invented new and useful Improvements in Cultivating Implements, of which the following is a specification.

This invention relates to improvements in cultivating implements of that type wherein the cultivator teeth are carried by a pair of beams which are pivoted at their forward ends to a central beam, forming a part of the frame and which extend rearwardly in diverging relation to one another and wherein means is provided for adjusting the angles of the teeth-carrying beams relatively to the central frame beam.

The improvements which form the subject of the invention are not confined in their useful application to any particular type of cultivating implement, but are equally applicable to cultivators, strictly so called, and to harrows. As shown herein by way of example, the present improvements are incorporated in a harrow.

The principal object of the invention is to provide simple, inexpensive, reliable and easily operated means for permitting adjustments of the angles of the teeth-carrying beams relatively to the central frame beam and for positively locking the teeth-carrying beams in any positions to which they may be adjusted.

With the above and other objects in view, the invention consists in certain novel features of structure, combination and relation which will be specifically pointed out as the description proceeds.

An embodiment of the invention is illustrated in the accompanying drawings, wherein:—

Figure 1 is a perspective view of a cultivating implement, specifically a harrow, in which the features of the invention are incorporated;

Fig. 2 is a plan view thereof, partly in section;

Fig. 3 is a detail sectional view more particularly illustrating the means for adjusting the angle of the teeth-carrying beams;

Fig. 4 is a detail sectional view on the line 4—4 of Fig. 2;

Fig. 5 is a section on the line 5—5 of Fig. 2; and

Fig. 6 is a section on the line 6—6 of Fig. 2.

Similar characters of reference designate corresponding parts throughout the several views.

The frame of the implement comprises the central frame beam 1 having an upturned extension 2 at its forward end which carries the usual clevis for the attachment of the swingle tree, (not shown), a pair of upwardly-inclined, rearwardly-diverging handles 3 connected at their forward lower ends to the beam 1, and a pair of braces 4 connecting the respective handle 3 and the rear portion of the beam 1.

The cultivator teeth 5, in this instance, harrow teeth, are secured by suitable clips and at suitable intervals to a pair of adjustable beams 6 located, respectively, at opposite sides of the beam 1 and pivotally connected at their forward ends to a suitable bracket attachment 7 rigidly secured on the beam 1.

The teeth-carrying beams 6 are symmetrical in their relation to the beam 1 and are normally arranged in rearwardly-diverging relation. The present invention provides for simultaneous and like adjustments of the positions of the beams 6 relatively to one another and to the beam 1 and the range of adjustment has, as one extreme, a position of the beams 6 wherein they are in substantially parallel relation, as shown by dotted lines in Fig. 2, and as the other extreme a position of the beams 6 wherein they are disposed at an angle of approximately 45°.

The means which provides for the adjustment of the beams 6 comprises an element 8 designated generally as a block and mounted to slide on the beam 1 lengthwise thereof, links 9, similar to toggle links, connecting the block 8 and the respective beams 6, a bar 10 projecting from the block 8 in a plane coincident with the plane of the beam 1, and a latch 11 for locking the bar 10 and therewith the block 8 against accidental movement lengthwise of the beam 1.

The block 8 comprises upper and lower plates 12 and 13 located adjacent the respective upper and under face of the beam 1. The plate 12 is preferably provided at its forward end with spaced, downwardly-projecting lugs 12$^a$ which overlie the beam at opposite sides thereof and which aid in centering said block upon said beam. The plates 12 and 13 are held in proper relation to the beam 1 by a U-bolt 14, the arms of which extend downwardly and carry nuts at their extremities which take against the plate 13. The bow portion 15 of the bolt 14 is extended rearwardly from the arms thereof and is arranged in a horizontal plane, said bow portion 15 constituting a pivot for the forward end of the bar 10. The bar 10 rests upon the upper side of the beam 1 and is preferably in the form of a rack bar in order that it may coöperate with the latch 11. The latch 11 is in the form of a rectangular frame having an inverted U-shape in end elevation and slidably mounted upon some fixed vertically extending guide. The braces 4 may be conveniently utilized as a guide for the latch 11 and for this purpose their lower portions 4a are arranged in parallel relation and the latch 11 surrounds the parallel brace portions 4a and is slidable thereon.

The arms of the bolt 14 extend at opposite sides of the beam 1 and not only hold the plates 12 and 13 in proper relation to said beam, but assist in centering the block 8 as an entirety relatively to the beam and form pivots for the links 9 which are preferably arranged in pairs at each side of the beam 1. The inner ends of the links 9 are held in spaced relation by spacing sleeves 16 arranged on the arms of the bolt 14 and serving the further purpose, by their contact with the sides of the beam 1, of anti-friction rollers, to enable easy movement of the block 8 lengthwise of the beam 1 when an adjustment of the positions of the teeth-carrying beams is to be made. The links 9 at their outer ends are connected to suitable brackets or clips 17 secured upon the beams 6. The clips 17 are provided with pivot pins or bolts 18 for the attachment of the outer ends of the links 9 and the bolts 18 carry spacing sleeves by which said links are held in spaced relation at their outer ends in the same manner and to the same extent that they are held in spaced relation at their inner ends by the sleeves 16.

The structure is completed by braces 19 which connect the handles 3 and the beams 6 and at their lower ends are pivoted on the bolts 18 of the clips 7 and at their upper ends are pivoted to brackets 20, which latter are fixed on the handles 3 and are conveniently parts of a cross-brace 21 connecting said handles. The braces 19 in combination with the block 8 determine the relative position of the beams 6 to one another and to the beam 1 and hold the beams 6 against movement on their pivots from any position to which they are adjusted but yield, by virtue of their pivotal connections with the clips 17 and the brackets 20, to permit sliding movements of the block 8 lengthwise of the beam 1 in the adjustment of the relative positions of the beams 6.

In order to effect an adjustment of the positions of the beams 6, the harrow is first slightly tilted to one side, and the latch 11, which normally engages in the notches of the bar 10, is then raised, manually or by means of a suitable implement to a suitable distance above said bar, thereby freeing the latter; and finally that beam 6 which happens to be raised from the ground is pulled outwardly or pushed inwardly to effect the adjustment desired. If the angle of the beams 6 is to be increased, the raised beam 6 is pulled outwardly. If the angle of the beams 6 is to be decreased, said raised beam 6 is pushed inwardly. During the adjusting movements of the beams 6, the block 8 slides on the beam 1 as is obvious. When the beams 6 have been set at the desired angle relatively to one another, the latch 11 is released and slides upon the brace portions 4a as guides until it comes to rest upon the bar 10 with its cross pieces engaged in the notches of said bar.

In addition to varying the adjustment of the beams 6 relatively to one another, it may occasionally be desired, in view of the exigencies of use, to vary the range of adjustment of said beams. For this purpose, the beams 6 may be each provided with a plurality of clips 17 arranged at suitable and like intervals on said beams. Thus, the drawings show the beams 6 as equipped with a pair of said clips. To vary the range of adjustment of the beams 6, the outer ends of the links 9 and the forward ends of the braces 19 are disconnected from their clips 17 and are connected to other clips 17 located at other corresponding points on the beams 6.

It will be apparent from the foregoing description that the adjustment of the beams 6 may be quickly and readily effected; and that the structure providing for such adjustment is not detrimentally affected by rust or dirt; reliably determines the relative positions of said beams; reliably and positively holds the beams in the positions to which they are adjusted; and provides for a range of adjustment of said beams amply suitable for all work for which the implement is designed.

Having thus fully described my invention, I claim:—

1. In a structure having a frame beam, and links at opposite sides of said beam, the combination of a block mounted to slide on said frame beam lengthwise thereof and composed of upper and lower plates, and a U-bolt the arms of which are disposed at opposite sides of said frame beam and connect said plates; a latch bar pivoted to the bow portion of the U-bolt and disposed in the plane of and resting upon the frame beam, the inner ends of the links being pivoted on the arms of the U-bolt; and a latch for engagement with the latch bar to hold the same and therewith the block against movement lengthwise of the frame beam, the latch being movably mounted upon a stationary frame part.

2. In a structure having a frame beam, and links at opposite sides of said beam, the combination of a block mounted to slide on said frame beam lengthwise thereof and composed of upper and lower plates, and a U-bolt the arms of which are disposed at opposite sides of said frame beam and connect said plates; and means for locking the block against accidental sliding movement lengthwise of the frame beam, the inner ends of the links being pivoted on the arms of the U-bolt.

3. In a structure having a frame beam, and a brace part connected to said frame beam, the combination of a block mounted to slide on said frame beam lengthwise thereof; a rack bar connected to the block and disposed in the plane of and resting upon said frame beam; and a latch for engagement with the rack bar, to hold the same and therewith the block against movement lengthwise of the frame beam, the latch comprising a rectangular frame slidably mounted upon said brace part, and having its cross-bars arranged to engage in the notches of the rack bar.

4. In a cultivating implement, in combination, a frame including a central frame beam; a pair of handles connected and braced to said frame beam; teeth-carrying beams pivoted at their forward ends at opposite sides of said central frame beam; a block slidable lengthwise of said central frame beam; links connecting the block and the teeth-carrying beams, to cause sliding movements of the former consequent upon pivotal movements of the latter; and braces pivotally connected with said handles and with said teeth-carrying beams, the pivots of said braces and said teeth-carrying beams being coincident with the pivots of said teeth-carrying beams and said links.

In testimony whereof I have hereunto set my hand in presence of two subscribing witnesses.

ALBERT S. POE.

Witnesses:
E. C. TURLEY,
B. L. ECKLES.

Copies of this patent may be obtained for five cents each, by addressing the "Commissioner of Patents, Washington, D. C."